(12) United States Patent
Feenstra et al.

(10) Patent No.: US 7,898,718 B2
(45) Date of Patent: *Mar. 1, 2011

(54) DISPLAY DEVICE

(75) Inventors: Bokke Johannes Feenstra, Eindhoven (NL); Robert Andrew Hayes, Eindhoven (NL); Menno Willem Jose Prins, Eindhoven (NL)

(73) Assignee: Liquavista B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/292,015

(22) Filed: Nov. 10, 2008

(65) Prior Publication Data

US 2009/0141335 A1 Jun. 4, 2009

Related U.S. Application Data

(63) Continuation of application No. 10/504,708, filed as application No. PCT/IB2003/00196 on Jan. 24, 2003, now Pat. No. 7,463,398.

(30) Foreign Application Priority Data

Feb. 19, 2002 (EP) .................................. 02075676

(51) Int. Cl.
*G02B 26/02* (2006.01)
*G02F 1/03* (2006.01)
*G09G 3/36* (2006.01)
*G09G 5/00* (2006.01)

(52) U.S. Cl. ....................... 359/253; 359/245; 359/228; 345/41; 345/87; 345/204

(58) Field of Classification Search ......... 359/245–247, 359/228, 252–254, 276, 296, 297; 345/6, 345/32, 41, 51, 55, 84, 85, 48, 60, 105–107, 345/89, 179, 204; 349/78–80, 84, 95, 144, 349/145

See application file for complete search history.

(56) References Cited

U.S. PATENT DOCUMENTS 3,322,482 A 5/1967 Harmon
3,813,265 A 5/1974 Marks (Continued)

FOREIGN PATENT DOCUMENTS

EP 0 884 714 A2 12/1998

(Continued)

OTHER PUBLICATIONS

Chinese Office Action dated Jul. 7, 2006.

*Primary Examiner*—Loha Ben
(74) *Attorney, Agent, or Firm*—BainwoodHuang (57) ABSTRACT

Display device is based on layer break up or layer displacement having at least two different states, in which one of the fluids, e.g., oil in a first state, adjoins at least a first support plate and, in the second state, the other fluid at least partly adjoins the first support plate. In one embodiment, a picture element corresponds to a substantially closed space and, in the first state, the other fluid layer substantially completely adjoins both support plates and is divided in two sub-layers. This makes it possible, on the one hand, to use lower voltages to make displacement occur. On the other hand, this opens the opportunity to color displays.

44 Claims, 4 Drawing Sheets

U.S. PATENT DOCUMENTS

| | | | |
|---|---|---|---|
| 3,863,249 A | 1/1975 | Olah | |
| 3,915,555 A | 10/1975 | Leibowitz | |
| 3,972,595 A | 8/1976 | Romankiw et al. | |
| 4,079,368 A | 3/1978 | DiStefano | |
| 4,176,345 A | 11/1979 | Micheron et al. | |
| 4,203,106 A | 5/1980 | Dalisa et al. | |
| 4,235,522 A | 11/1980 | Simpson et al. | |
| 4,248,501 A | 2/1981 | Simpson | |
| 4,411,495 A | 10/1983 | Beni et al. | |
| 4,419,663 A | 12/1983 | Kohashi | |
| 4,442,019 A | 4/1984 | Marks | |
| 4,569,575 A | 2/1986 | Le Pesant et al. | |
| 4,582,391 A | 4/1986 | Legrand | |
| 4,583,824 A | 4/1986 | Lea | |
| 4,589,730 A | 5/1986 | Obu | |
| 4,636,785 A | 1/1987 | Le Pesant | |
| 4,660,938 A | 4/1987 | Kazan | |
| 4,663,083 A | 5/1987 | Marks | |
| 4,795,243 A | 1/1989 | Suzuki | |
| 5,106,521 A | 4/1992 | Kurachi et al. | |
| 5,165,013 A | 11/1992 | Faris | |
| 5,181,016 A | 1/1993 | Lee | |
| 5,354,692 A | 10/1994 | Yang et al. | |
| 5,463,491 A | 10/1995 | Check, III | |
| 5,574,598 A | 11/1996 | Koumura et al. | |
| 5,582,700 A | 12/1996 | Bryning et al. | |
| 5,659,330 A | 8/1997 | Sheridon | |
| 5,731,792 A | 3/1998 | Sheridon | |
| 5,757,345 A | 5/1998 | Sheridon | |
| 5,808,593 A | 9/1998 | Sheridon | |
| 5,815,306 A | 9/1998 | Sheridon et al. | |
| 5,841,492 A | 11/1998 | Iwauchi et al. | |
| 5,872,552 A | 2/1999 | Gordon, II et al. | |
| 5,892,497 A | 4/1999 | Robertson | |
| 5,956,005 A | 9/1999 | Sheridon | |
| 5,961,804 A | 10/1999 | Jacobson et al. | |
| 6,120,588 A | 9/2000 | Jacobson | |
| 6,221,267 B1 | 4/2001 | Ikeda et al. | |
| 6,268,092 B1 | 7/2001 | Akashi et al. | |
| 6,369,954 B1 | 4/2002 | Berge et al. | |
| 6,377,249 B1 | 4/2002 | Mumford | |
| 6,400,492 B1 | 6/2002 | Morita et al. | |
| 6,449,081 B1 | 9/2002 | Onuki et al. | |
| 6,473,072 B1 | 10/2002 | Comiskey et al. | |
| 6,482,306 B1 | 11/2002 | Yager et al. | |
| 6,525,866 B1 | 2/2003 | Lin et al. | |
| 6,529,313 B1 | 3/2003 | Lin et al. | |
| 6,574,034 B1 | 6/2003 | Lin et al. | |
| 6,577,433 B1 | 6/2003 | Lin et al. | |
| 6,587,083 B1 | 7/2003 | Basturk | |
| 6,603,444 B1 | 8/2003 | Kawanami et al. | |
| 6,700,556 B2 | 3/2004 | Richley et al. | |
| 6,721,083 B2 | 4/2004 | Jacobson et al. | |
| 6,873,451 B2 | 3/2005 | Ukigaya | |
| 6,924,792 B1 | 8/2005 | Jessop | |
| 6,961,167 B2 | 11/2005 | Prins et al. | |
| 6,967,763 B2 | 11/2005 | Fujii et al. | |
| 7,187,344 B2 | 3/2007 | Feenstra et al. | |
| 7,259,744 B2 | 8/2007 | Arango et al. | |
| 7,307,672 B2 * | 12/2007 | Feenstra et al. | 349/15 |
| 7,310,080 B2 | 12/2007 | Jessop | |
| 7,420,549 B2 * | 9/2008 | Jacobson et al. | 345/204 |
| 7,561,131 B2 * | 7/2009 | Ijzerman et al. | 345/87 |
| 2005/0285816 A1 | 12/2005 | Glass | |

FOREIGN PATENT DOCUMENTS

| | | | |
|---|---|---|---|
| EP | 1 069 450 A2 | 1/2001 | |
| EP | 1069450 A2 | 1/2001 | |
| EP | 1014161 | 12/2001 | |
| EP | 1 180 713 A2 * | 2/2002 | |
| EP | 1400834 A1 | 3/2004 | |
| JP | 52-140233 | 11/1977 | |
| JP | 2000-356751 | 12/2000 | |
| JP | 2000356751 | 12/2000 | |
| WO | WO 2004/027489 A1 * | 4/2004 | |
| WO | WO 2004/079439 A2 | 9/2004 | |

* cited by examiner

DISPLAY DEVICE

CROSS-REFERENCE TO RELATED APPLICATIONS

This application is a continuation of application Ser. No. 10/504,708 filed Aug. 16, 2004 (now U.S. Pat. No. 7,463, 398), which was a U.S. National Stage entry of International Application No. PCT/IB2003/00196 filed Jan. 24, 2003, which claimed priority based on EP Application No. 02075676.3 filed Feb. 19, 2002, the entire contents of each are incorporated herein by reference.

BACKGROUND

1. Technical Field

The invention relates to a display device comprising picture elements having at least one first fluid and a second fluid immiscible with each other within a space between a first support plate and a second support plate, one of the fluids being electroconductive or polar, the device comprising means for creating at least two different states.

The invention further relates to a switchable diffusing device.

2. Related Art

Display devices like TFT-LCDs are used in laptop computers and in organizers, but also find an increasingly wider application in GSM telephones. Instead of LCDs, for example, (polymer) LED display devices are also being used.

Apart from these display effects which are well established by now, other display techniques are evolving like electrophoretic displays, which are suitable for paper white applications.

The diffusing device may be used in several devices, such as cameras.

BRIEF SUMMARY

The display device according to the invention has at least two different states, in which one of the fluids in a first state adjoins at least the first support plate and, in the second state, the other fluid at least partly adjoins the first support plate.

The invention is based on a principle discovered by the inventors so called layer break up, but on the other hand, layer displacement may be used. The invention provides new ways of using these principles.

If, for instance, a (first) fluid is a (colored) oil and the second (the other) fluid is water (due to interfacial tensions), a two-layer system is provided which comprises a water layer on top of the oil layer. However, if a voltage is applied between the two layers, the oil layer breaks up due to electrostatic forces. Since parts of the water now penetrate the oil layer, the picture element becomes partly transparent.

The contrast is limited by the fraction of area occupied by the droplets of the (first) fluid ((colored) oil) remaining after the break-up. Typically, depending on the thickness of the original fluid layer, an area of 25-50% is realized. This can be decreased further by applying higher voltages which, however, would increase the dissipated power significantly. Ideally, one would like the remnant area occupied by the fluid, in this case optically absorbing oil, to approach 0%.

A further limitation is that, upon break-up, the area fraction is reduced instantly to about 50%. It is, therefore, hard to obtain area fractions close to 100%. As a result, realizing of analog gray scales may become difficult.

In a first embodiment, a picture element corresponds to a defined space (e.g., a substantially closed space) and, in the second state, the other fluid substantially completely adjoins the first support plate. According to a further aspect of the invention, this achieved by applying an inhomogeneous electric field. In that case, the threshold field for layer break up (or displacement) will be exceeded only at certain specific places. At those places, oil-film break up (or displacement) will be initiated. An inhomogeneous applied electric field can be obtained in several ways.

To this end, in a first preferred embodiment of the invention, the dielectric layer between an electrode and the surface of the part of the first support plate varies in thickness.

In a further embodiment, the dielectric layer between an electrode and the surface of the part of the first support plate has a varying dielectric constant.

By increasing the electric field, the threshold for oil-film break up (or displacement) is displaced over the area of the support plate and can be controlled. This makes possible the realization of gray levels.

On the other hand, oil-film break up (or displacement) can be controlled by varying the wettability of the part of the first support plate or the thickness of the first fluid layer.

Furthermore, it is possible to use the stray field distribution at the edge of electrodes, or even design a segmented electrode structure that provides the desired inhomogeneous field distribution.

In a further embodiment according to the invention, a picture element corresponds to a defined space and, in the first state, the other fluid layer substantially completely adjoins both support plates. In fact, the other fluid layer (the oil layer) is now divided in two sub-layers, which each may be thinner. This makes it possible, on the one hand, to use lower voltages to make oil-film break up (or displacement) occur. On the other hand, this opens the opportunity to color displays and the realizing of a larger variety of gray values.

To this end, in a preferential embodiment of the invention, a picture element corresponds to a defined space having a further wall dividing the space into at least two sub-picture elements, in the first state a further other fluid layer adjoining the first support plate at least partly within the sub-picture elements. By giving said (further) other fluid layer different colors, a color display is obtained.

To obtain a remnant area occupied by the further fluid after break up in the second state, at least one of the other fluid layer and the further other fluid layer adjoins a wall of the space. To prevent intermixing of the material of both sub-layers adjoining the wall, the device preferably comprises means to prevent part of the other fluid layer and the further other fluid layer to intermix in the second state.

These and other aspects of the invention are apparent from and will be elucidated with reference to the embodiments described hereinafter.

BRIEF SUMMARY OF THE DRAWINGS

In the drawings:

FIG. 4 is a diagrammatic cross-section of a part of a color display device according to the invention, while

DETAILED DESCRIPTION OF EXEMPLARY EMBODIMENTS

Figure 1A:
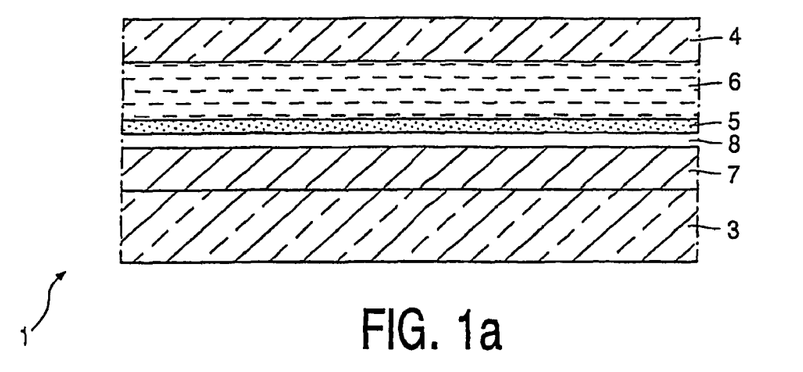
FIGS. 1a and 1b are diagrammatic cross-sections of a part of a display device according to the invention.
Figure 1B:
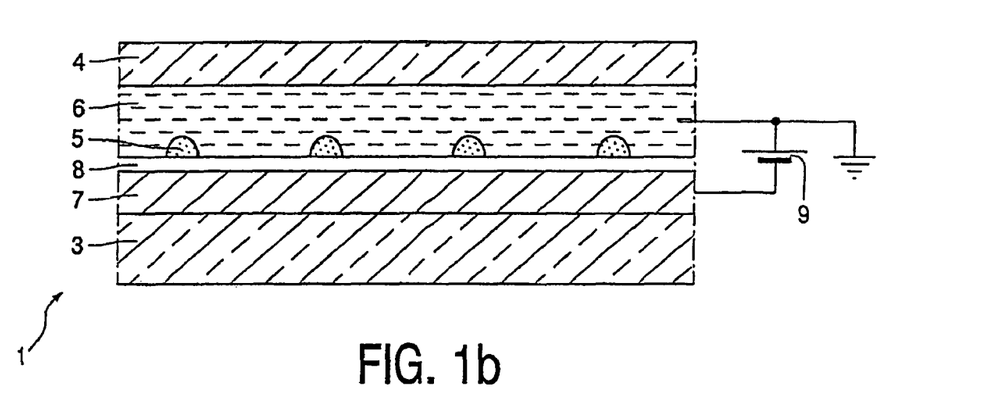

FIGS. 1a and 1b show diagrammatic cross-sections of a part of a display device 1 according to an exemplary embodiment of the invention. Between two transparent substrates or support plates 3, 4, a first fluid 5 and a second fluid 6 are provided, which are immiscible with each other. The first fluid 5 is, for instance, an alkane-like hexadecane or, as in this example, a (silicone) oil. The second fluid 6 is electroconductive or polar, for instance, water or a salt solution (e.g., a solution of KCl in a mixture of water and ethyl alcohol). In a first state, when no external voltage is applied (FIG. 1a), the fluids 5, 6 adjoin the first and second transparent support plates 3, 4 of, e.g., glass or plastic. On the first support plate 3, a transparent electrode 7, for example, indium (tin) oxide is provided and an intermediate hydrophobic layer 8, in this example, an amorphous fluoropolymer (AF 1600).

The inventors have found that when a voltage is applied (voltage source 9), the layer 5 breaks up into small droplets (FIG. 1b, fragmented film). Break-up occurs when the electrical energy gain is larger than the surface energy loss due to the creation of curved surfaces. As a very important aspect, it was found that reversible switching between a continuous film and a fragmented film is achieved by means of the electrical switching means (voltage source 9).

This effect can be used for electro-optical effects, especially if a colored oil is used for a display effect. This is achieved with an optically active oil, for example, an opaque or reflective oil. In other embodiments, a fluid with optically active particles is used or a dye material is dissolved in the oil. The electro-optical effect may either be used in a transparent way, by using a back light, as for instance is known from LCD technology or in a reflective way by using a (diffusive) reflector.

The droplet size depends on the voltage applied which, in principle, offers the possibility of introducing intermediate transmission (or reflection) states (gray levels). However, it was also found that, upon break-up, the area fraction is reduced practically instantly to about 50%. It is, therefore, hard to obtain area fractions between 50% and 100%. As a result, arbitrary analog gray scales in this particular range are difficult to be realized.

On the other hand, the contrast is limited by the fraction of area occupied by the droplets resulting after the break-up. At practical voltages (in view of driving the display with IC drivers), a minimal area fraction of about 25% is observed. This can be decreased further by applying higher voltages which, however, would increase the dissipated power significantly and possibly preclude the use of low voltage IC drivers.

Figure 2:
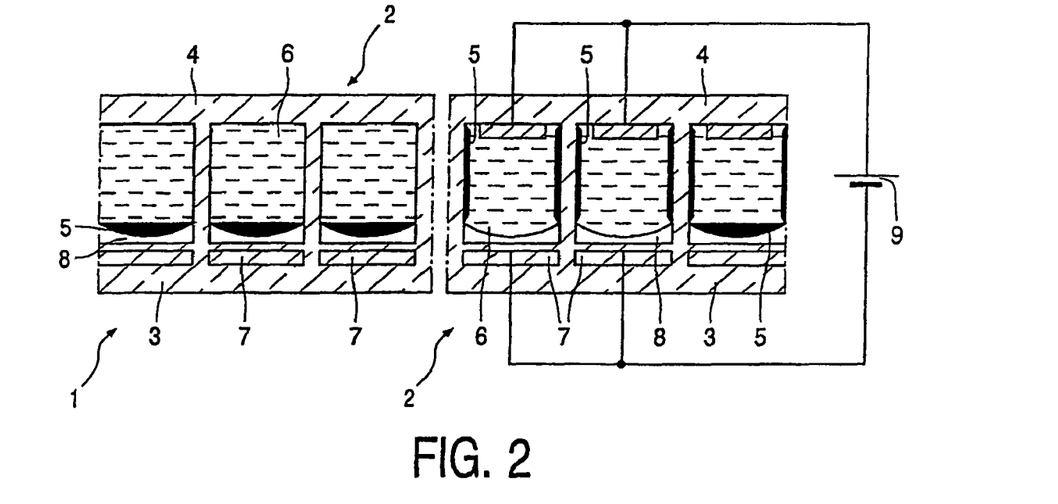
FIG. 2 is another diagrammatic cross-section of a part of a display device according to the invention.
Figure 3:
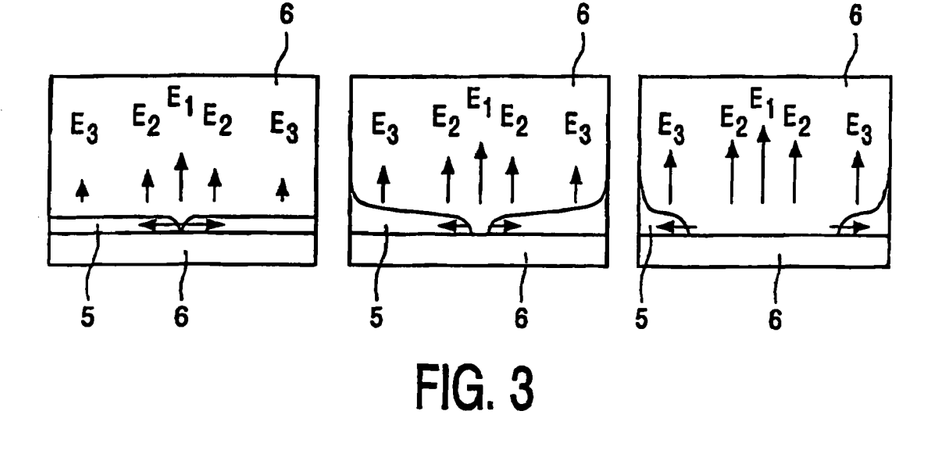
FIG. 3 is a diagrammatic of a part of a display device according to the invention.

To this end, in the embodiment of FIG. 2, the intermediate hydrophobic layers 8 have a curved form with the smallest thickness in the center, ensuring that the electrical field is highest in the center of a picture element 2. In this case, the field varies in a radial manner (by the varying thickness of the insulator). The threshold field will be first exceeded at the center of the pixel, where the insulator has the minimum thickness. Upon increasing the field, the position at which the applied field equals the threshold field will move outward, hence moving the oil to the side of the pixel. The schematic drawing in FIG. 3 shows a cross-section of a pixel that is either circularly symmetric, or has a rectangular shape. In the first case, the oil will be pushed outward in a ring-like shape, starting from a single point in the center of the pixel. For a rectangular pixel, one can envisage an insulator shaped like a slice of cylinder so that the oil break-up will start along a line, and the oil is pushed out in a curtain-like fashion.

By introducing this curved form of the layer 8, the optically absorbing oil layer 5 is displaced to a position inside the pixel, where the optical activity is no longer relevant, in this case to the side (or the back) of the pixel. Below a particular threshold field $E_t$, no break-up occurs, whereas at fields higher than $E_t$, the oil film will break-up into droplets. Break up was found to occur at field strengths of about 3 V/μm over a wide range of insulator thicknesses (0.3-10 μm).

In another example, the stray field distribution at the edge of electrodes is used, or a special electrode structure (segmented, perforated) that provides the desired inhomogeneous field distribution is used.

Although in this example, oil break up has been considered, similar arguments apply to a device base on fluid displacement. On the other hand, an inhomogeneous oil layer (due to, e.g., insufficient volume, thickness variation or contact angles) may initiate the oil displacements (or break up).

In the case of oil-film break up for thick oil films 5, the oil film thickness is no longer negligible compared to the thickness of the insulator 8 and higher voltages are needed to obtain oil film break up. Therefore, this principle is limited to the use of thin films (up till about 300 nm). For films of such thickness, it is difficult to have sufficient optical absorption, which yields a reduced optical contrast between the on and off state.

In the case of displacement, an inhomogeneous field distribution, that effectively gives rise to a varying surface tension across the pixel, is used. Now, the total system can lower its energy by moving the oil to the position(s) with the lowest surface energy and one is able to move the oil film out of sight. This principle works at relatively low voltages for thicker oil films as well as thin ones, which relaxes the requirements for the optical absorptivity of the oil film. Furthermore, this principle allows the realizing of gray values.

Figure 4:
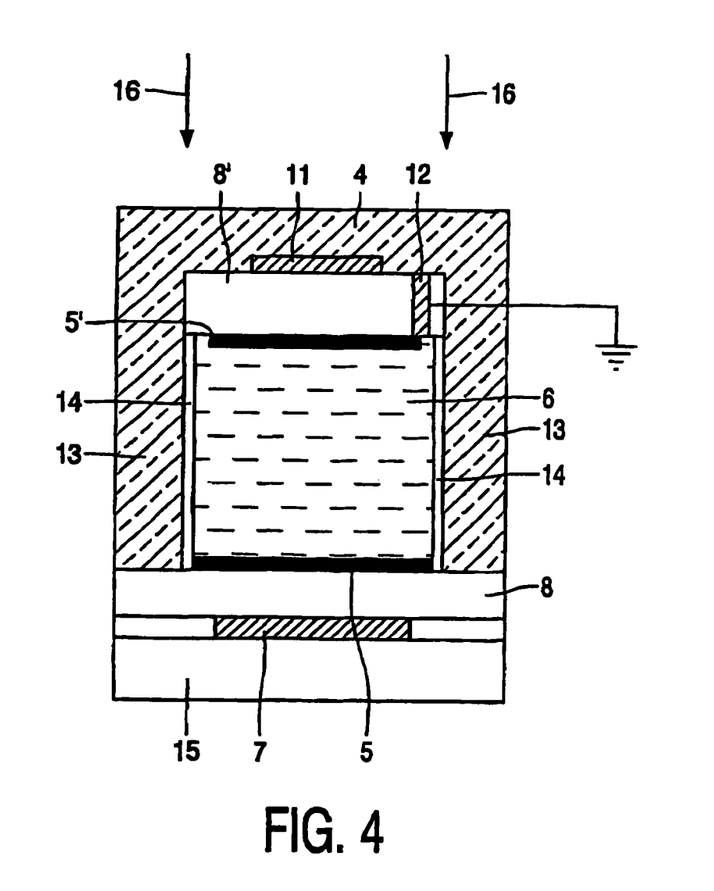

A further embodiment is shown in FIG. 4 which comprises two separate oil layers 5, 5' on either side of the fluid (water) 6.

By either fabricating the pixel walls 13 out of a different material than the material of the layers 8, 8' (e.g., Teflon-like AF 1600) or providing these walls 13 with such material 14 with a sufficiently high surface energy such that:

$$\gamma_{H2O,S} < \gamma_{oil,H2O} + \gamma_{oil,S}$$

"S" indicates the solid barrier material 14. No oil film forms on the barriers or material 14. This means that the upper oil film 5' and the lower oil film 5 are in no way connected to one another in either the first or the second state. Each layer can now be switched independently by contacting the water 6 by means of a through-connection (electrode 12 in FIG. 4) through the upper (or lower) AF 1600 layer. In practice, this can be done by grounding the water 6 by means of electrode 12 and applying a voltage to either electrode 7 or electrode 11. The device further comprises a diffuse white reflector 15. The viewing direction is indicated in FIG. 4 by the arrows 16.

Some examples of materials for which the inequality given above holds are parylene, PMMA (polymethylmethacrylate) and glass.

By giving the layers 5, 5' different colors, e.g., by introducing a dye, color displays are realized. This will be elucidated in the next examples.

EXAMPLE 1

Three-Color Display

Figure 5:
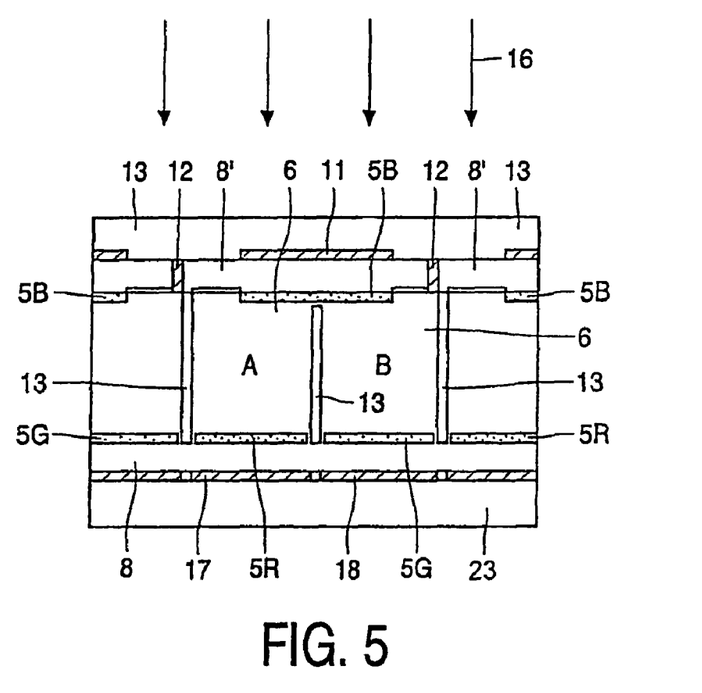
FIGS. 5, 6 and 7 show further embodiments of the invention.

In the embodiment of FIG. 5, the oils 5 have different colors by using different dyes to realize a color display. In this example, three kinds of, e.g., oil are used, viz a red layer 5R, a green layer 5G and a blue layer 5B, to obtain the highest possible brightness for the configuration shown in FIG. 5. A single pixel comprises a black absorber 23 (background) and two sub-pixels A and B, each having a configuration comparable to the one shown in FIG. 4. The oil layer 5B on the top in the first state covers half of each of the sub-pixels. This can be achieved by locally modifying the surface energy of the layer 8' (AF 1600). The other fluid, in this case water is assumed to be at a fixed voltage, for example ground (0V) via electrode 12.

To obtain a red colored pixel in this configuration, electrode 17 underneath the red layer of oil 5R should be grounded (0V), whereas electrode 18 underneath the green layer of oil 5G and electrode 11 above the blue layer of oil 5B should be activated by applying a voltage V. The green and blue layers will break up or move to the side and the sub-pixel B above the black absorber 23 becomes transparent. As a result, the total pixel will appear red, since sub-pixel A looks red and sub-pixel B looks black. The maximum brightness is limited to 50%. This maximum brightness is a significant improvement with respect to a configuration with three parallel pixels, where the maximum brightness is limited to 33%.

In a similar fashion, one can obtain a green pixel with a maximum brightness of 50% and a blue pixel with a maximum brightness of 50%. A summary of the voltages applied to the electrodes and the maximum brightness for each of the primary colors, black and white is given in Table 1.

TABLE 1

| Color | Voltage Electrode 12 | Voltage Electrode 17 | Voltage Electrode 18 | Voltage Electrode 11 | Brightness (%) |
|---|---|---|---|---|---|
| Red | 0 | 0 | V | V | 50 |
| Green | 0 | V | 0 | V | 50 |
| Blue | 0 | V | V | 0 | 50 |
| White | 0 | 0 | 0 | 0 | Varying |
| Black | 0 | V | V | V | 0 |

The white state is obtained by reflecting light of all colored layers simultaneously. The color distribution of the white state, however, depends strongly on the size chosen for the blue layer 5B. In the example above, the blue layer occupies half of the pixel. As a result, the green and the red will contribute 25% to the white, which will seem distorted. If the blue layer covers 33% of the total area, the color distribution of the white state will look better, albeit with a low overall reflectivity of 33%. However, now the blue state will reach a maximum brightness of 33% instead of 50%.

The configuration as shown in FIG. 5 is chosen as an example. Other configurations, with red or green on top, can be used as well. In fact, by choosing the color with the highest reflectivity on top, one can reduce the color distortion caused by the different sizes of the area occupied by each of the colors and/or account for the eye sensitivity.

EXAMPLE 2

Three-Color Plus White Display

The variation in brightness in the white state arising in Example 1 can be circumvented by using a white oil. A white oil is, e.g., obtained by dispersing scattering particles in the oil.

Figure 6:
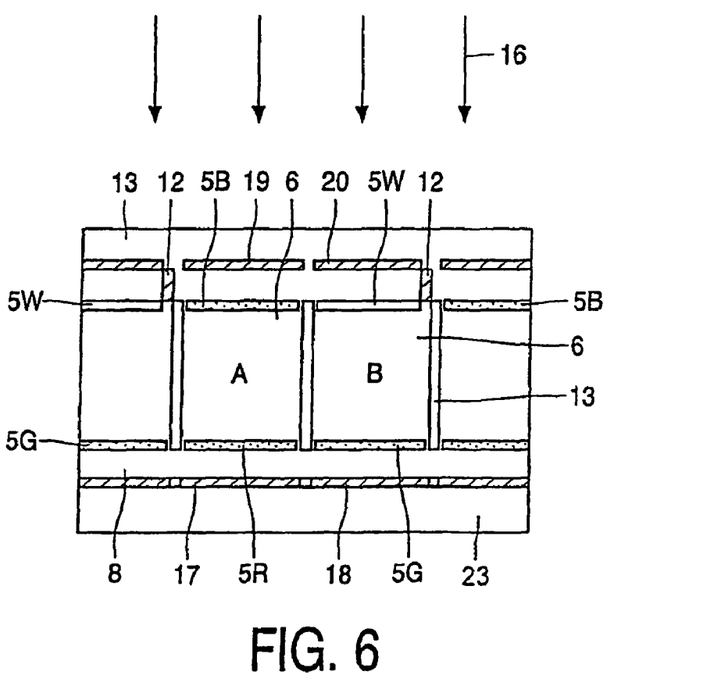

The configuration shown in FIG. 6 uses such a white oil. In a similar way as in Example 1, different colors are obtained by providing voltages to electrodes 17 (underneath the red layers of oil 5R), the electrodes 18 (underneath the green layers of oil 5G), the electrodes 19 (above the blue layer of oil 5B) and the electrodes 20 (above the white layer of oil 5W). The result is given in Table 2.

TABLE 2

| Color | Voltage electr. 12 | Voltage electr. 17 | Voltage electr. 18 | Voltage electr. 19 | Voltage electr. 20 | Brightness (%) |
|---|---|---|---|---|---|---|
| Red | 0 | 0 | V | V | V | 50 |
| Green | 0 | V | 0 | V | V | 50 |
| Blue | 0 | V | V | 0 | V | 50 |
| White | 0 | V | V | V | 0 | 50 |
| Black | 0 | V | V | V | V | 0 |

As in the previous example, the color ordering can be altered if necessary. Also, for example, a high brightness white state, reflecting 100%, can be achieved when the black absorber 23 is replaced by a white reflector and the oil layer at the top of sub-pixel B is black. However, in this configuration, no satisfactory black state can be obtained, due to the contribution of sub-pixel A which is either in a colored or a white state. This, however, reduces the contrast obtained.

EXAMPLE 3

Subtractive Color Display

Figure 7:
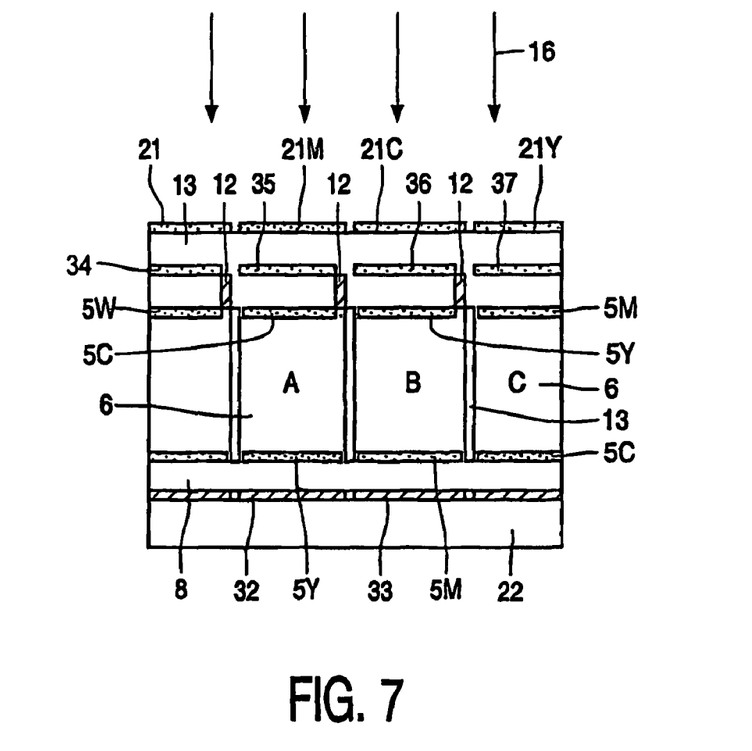

Alternatively, as shown in FIG. 7, subtractive colors may be used. If two oil-layers 5 inside each sub-pixel are used, one primary color per sub-pixel can be achieved. If a fixed subtractive color filter 21 is provided on top, a major improvement of the display performance is obtained. The pixel shown in FIG. 7 consists of three sub-pixels A, B and C. In each of the sub-pixels, the order of the subtractive colors alternates, i.e., M(agenta), C(yan), Y(ellow) for sub-pixel A, C(yan), Y(ellow), M(agenta), for sub-pixel B and Y(ellow), M(agenta), C(yan) for sub-pixel C.

It is now possible to make each of the primary colors in at least two of the sub-pixels. For instance, in sub-pixel A, the magenta color filter part 21M absorbs green and the (switchable) yellow bottom oil layer 5Y absorbs blue. If the top cyan oil layer 5C, which absorbs red, is switched to a transparent state, the red light is reflected by the white background layer (reflector 22) and sub-pixel A will appear red.

In a similar way, sub-pixel C will appear red by switching the bottom oil layer 5C to a transparent state. For sub-pixel B, the cyan color filter 21C absorbs red and if none of the oil layers 5Y, 5M in sub-pixel B are switched to the transparent state will the sub-pixel B will appear black. Since the sub-pixels are sufficiently small, the human eye does not distinguish the individual responses and the total pixel will appear red with a maximum brightness of 67%. Other colors can be obtained in a similar fashion. A summary of the colors and the corresponding voltage states are given in Table 3.

TABLE 3

| | \multicolumn{7}{c|}{Voltages on Electrodes} | |
| Color | Electr. 12 | Electr. 32 | Electr. 33 | Electr. 34 | Electr. 35 | Electr. 36 | Electr. 37 | Brightness (%) |
| --- | --- | --- | --- | --- | --- | --- | --- | --- |
| Red | 0 | 0 | 0 | V | V | 0 | 0 | 67 |
| Green | 0 | 0 | V | 0 | 0 | 0 | V | 67 |
| Blue | 0 | V | 0 | 0 | 0 | V | 0 | 67 |
| White | 0 | V | V | V | V | V | V | 67 |
| Black | 0 | 0 | 0 | 0 | 0 | 0 | 0 | 0 |

The protective scope of the invention is not limited to the embodiments described. For instance, the layer 6 may be chosen to be scattering (by using a solution of $TiO_2$) or reflective (by using a solution of a suitable pigment). Driving voltages may also be capacitively coupled to the electrodes; especially capacitive coupling to electrodes 12 prevents degradation of the fluid 5. One or more reservoirs may be incorporated for overflow or supply of fluid(s) if fluid volumes in the reservoirs change due to temperature, pressure or otherwise.

Figure 8:
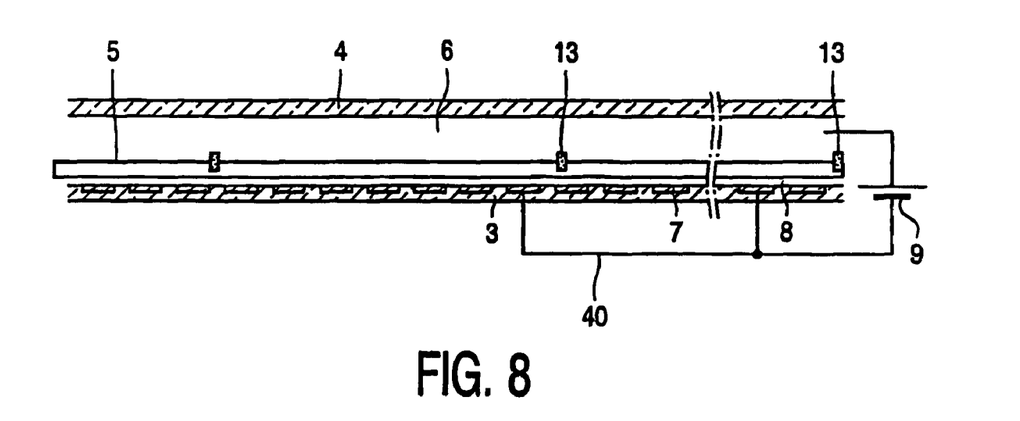
FIG. 8 shows another diagrammatic cross-section of a part of a display device according to the invention.

Finally, FIG. 8 shows an embodiment in which the pixel walls 13 do not extend across the whole pixel thickness. It appears that the oil film 5 is very stable, which is enhanced even further as the pixel size decreases. So during switching, the oil remains confined in each area providing the wall is not less than twice the height of the off-state oil film thickness. This means that a common channel can be employed for the fluid 6, which simplifies display fabrication and driving. The single electrical contact to the liquid can then be made externally. The other reference numerals have the same meaning as those in FIG. 4.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

What is claimed is:

1. A display device comprising:
   picture elements having at least one first fluid and a second fluid immiscible with each other within a space between a first support plate and a second support plate, the second fluid being electroconductive or polar,
   a picture element of the device being electrically switchable between at least a first state without an electric field applied and a second, different state with an electric field applied,
   in which in the first state the first fluid is spread out in the picture element and adjoins an area of the first support plate, and
   in the second state the second fluid adjoins the said area of the first support plate and the first fluid is contracted at a side of the picture element,
   in which said states provide a display effect over the area, and the first fluid is confined to the space of the picture element in the first state and in the second state.

2. A display device according to claim 1, in which the second fluid is confined to the space of the picture element.

3. A display device according to claim 1, in Which in the second state the first fluid is absent from a volume between the first support plate and the second support plate bound by the area of the first support plate.

4. A display device according to claim 1, wherein in the first state the second fluid forms a fluid layer on the first fluid, the first fluid being arranged between the second fluid layer and the first support plate.

5. A display device according to claim 4, wherein the first fluid forms a first fluid layer.

6. A display device according to claim 1, in which the second fluid forms a layer common to several picture elements.

7. A display device according to claim 1, the device comprising an inhomogeneous electric field creator for creating within a picture element an inhomogeneous electric field at the surface of a part of the first support plate.

8. A display device according to claim 7, wherein the inhomogeneous electric field is applied for moving the first fluid to the side of the picture element.

9. A display device according to claim 7 or 8, in which a dielectric layer between an electrode and a surface of the part of the first support plate varies in thickness or has a varying dielectric constant.

10. A display device according to claim 7 or 8, in which the surface of a part of the first support plate has a varying wettability or the first fluid layer has a varying thickness.

11. A display device according to claim 7 or 8, including an electrode structure for creating the inhomogeneous electric field.

12. A display device according to claim 7 or 8, including an electrode having edges, a stray field of the edges forming the inhomogeneous electric field.

13. A display device according to claim 1, in which the first fluid adjoins only one of the support plates in the first state and in the second state.

14. A display device according to claim 1, in which a picture element corresponds to a defined space and in the second state the second fluid substantially completely adjoins the first support plate.

15. A display device according to claim 1, in which the picture element corresponds to a defined space including a further first fluid which forms in a further first state a further first fluid layer adjoining the second support plate.

16. A display device according to claim 15 in which the picture element has a wall part dividing the space into at least two sub-picture elements, in the first state the further first fluid layer adjoining the second support plate at least partly within both sub-picture elements.

17. A display device according to claim 15 in which the first fluid layer and the further first fluid layer have different colors.

18. A display device according to claim 15 in which in the second state at least one of the first fluid layer and the further first fluid layer adjoins a wall part of the space.

19. A display device according to claim 1 which comprises an absorber or a reflector configured to absorb or reflect light incident on the display device.

20. A display device according to claim 1 which comprises a reflector configured to reflect light incident on the display device, wherein the reflector is diffusive.

21. A display device according to claim 1, in which the second fluid is a scattering, a reflective or an absorbing fluid.

22. A display device according to claim 1 in which the second fluid is a scattering fluid, wherein the scattering fluid includes $TiO_2$.

23. A display device according to claim 1 which comprises a color filter.

24. A display device according to claim 1, wherein the fluids include a pigment.

25. A display device according to claim 24, wherein said second fluid includes the pigment.

26. A display device according to claim 1, wherein scattering particles are included in said first fluid and/or said second fluid.

27. A display device according to claim 1, wherein the first support plate includes a hydrophobic layer and said area of the first support plate is an area of the hydrophobic layer.

28. A display device according to claim 1, wherein the first fluid adjoins the first support plate in any state of the picture element.

29. A display device according to claim 1, wherein part of the first support plate is adjoined by first fluid in the first state and in the second state.

30. A display device according to claim 1, wherein the picture element is arranged to use electrostatic forces to switch the first fluid between the first state and the second state.

31. A display device according to claim 1, wherein the first fluid is arranged to be displaced by the second fluid in the switching from the first state to the second state.

32. A display device according to claim 1, wherein in the first state the first and second fluids adjoin each other substantially over an extent of the picture element.

33. A display device according to claim 1, including an electrode contacting the second fluid.

34. A display device according to claim 33, wherein said electrode is arranged on the first support plate.

35. A display device according to claim 34, in which the electrode is connected by a through-connection through a layer arranged on the support plate.

36. A display device according to claim 1, wherein an electrode is arranged on the first support plate for creating the electric field between the second fluid and the electrode.

37. A display device according to claim 1, wherein the picture element is partly transparent and partly reflective in one of the states.

38. A display device according to claim 1 having a viewing direction, wherein one of the support plates faces the viewing direction and the first fluid adjoins said support plate.

39. A display device according to claim 1, wherein the second fluid includes ions.

40. A display device according to claim 39, wherein the second fluid is an ionic liquid.

41. A display device comprising:
picture elements having at least one first fluid and a second fluid immiscible with each other within a space between a support plate assembly, the support plate assembly having at least a first support plate and a hydrophobic layer, and a second support plate, the second fluid being electroconductive or polar,
a picture element of the device being electrically switchable between at least a first state without an electric field applied and a second, different state with an electric field applied, in which in the first state the first fluid is spread out in the picture element and contacts an area of the support plate assembly, and
in the second state the second fluid contacts the said area of the support plate assembly and the first fluid is contracted at a side of the picture element,
in which said states provide a display effect over the area, and the first fluid is confined to the space of the picture element in the first state and in the second state.

42. The display device of claim 41, wherein the area of the support plate assembly is an area of the hydrophobic layer, in the first state the first fluid contacting the said area of the hydrophobic layer, and in the second state the second fluid contacting the said area of the hydrophobic layer.

43. A display device comprising:
picture elements having at least one first fluid and a second fluid immiscible with each other within a space between a support plate assembly, the support plate assembly having at least a first support plate and a hydrophobic layer, and a second support plate, the second fluid being electroconductive or polar,
a picture element of the device being electrically switchable between at least a first state without a voltage applied and a second, different state with a voltage applied, in which in the second state the second fluid contacts an area of the support plate assembly, and
in the first state the first fluid contacts the said area of the support plate assembly, and the first fluid forms a first fluid layer and the second fluid forms a second fluid layer on the first fluid layer, the first fluid layer being arranged between the second fluid layer and the support plate assembly,
in which said states provide a display effect over the area, and the first fluid is confined to the space of the picture element in the first state and in the second state.

44. The display device of claim 43, wherein the area of the support plate assembly is an area of the hydrophobic layer, in the first state the first fluid contacting the said area of the hydrophobic layer, and in the second state the second fluid contacting the said area of the hydrophobic layer.

* * * * *

UNITED STATES PATENT AND TRADEMARK OFFICE
CERTIFICATE OF CORRECTION

PATENT NO. : 7,898,718 B2  Page 1 of 1
APPLICATION NO. : 12/292015
DATED : March 1, 2011
INVENTOR(S) : Bokke Johannes Feenstra et al.

It is certified that error appears in the above-identified patent and that said Letters Patent is hereby corrected as shown below:

Title Page; item (30);
Foreign Application Priority Data "Feb. 19, 2002 (EP) 02075676" should read -- Feb. 19, 2002 (EP) 02075676.3 --

Signed and Sealed this
Twelfth Day of April, 2011

David J. Kappos
*Director of the United States Patent and Trademark Office*